United States Patent
Shin

(10) Patent No.: US 7,535,350 B2
(45) Date of Patent: May 19, 2009

(54) BROADCAST RECEIVER RECEIVING EMERGENCY ALERT SIGNAL AND METHOD OF PROCESSING THE EMERGENCY ALERT SIGNAL

(75) Inventor: Jung-min Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 11/271,885

(22) Filed: Nov. 14, 2005

(65) Prior Publication Data

US 2006/0161946 A1 Jul. 20, 2006

(30) Foreign Application Priority Data

Jan. 4, 2005 (KR) ...................... 10-2005-0000389

(51) Int. Cl.
*G08B 21/00* (2006.01)
*G08B 5/22* (2006.01)
*H04Q 1/30* (2006.01)
*G06F 3/00* (2006.01)
*G06F 9/44* (2006.01)
*G06F 9/46* (2006.01)
*G06F 13/00* (2006.01)
*G06F 15/16* (2006.01)
*G06F 15/173* (2006.01)

(52) U.S. Cl. ...................... 340/540; 340/7.59; 719/318; 709/207; 709/240

(58) Field of Classification Search ................ 340/7.51, 340/7.55, 7.59, 286.01, 286.02, 286.11, 540; 455/500, 512, 527; 719/318, 328; 709/207, 709/240

See application file for complete search history.

(56) References Cited

U.S. PATENT DOCUMENTS

| 4,616,214 | A | 10/1986 | Naito |
| 6,134,303 | A | 10/2000 | Chen |
| 6,452,492 | B1 | 9/2002 | Drury |
| 6,978,313 | B1 * | 12/2005 | Pietrowicz .................. 709/238 |
| 2002/0046299 | A1 * | 4/2002 | Lefeber et al. .............. 709/318 |
| 2004/0039744 | A1 | 2/2004 | Choi |
| 2004/0152460 | A1 | 8/2004 | La et al. |
| 2004/0193617 | A1 * | 9/2004 | Adler ......................... 707/100 |
| 2005/0248437 | A1 * | 11/2005 | Hellebust et al. ........... 340/7.51 |

FOREIGN PATENT DOCUMENTS

| JP | 8-46946 A | 2/1996 |
| JP | 2000-172970 A | 6/2000 |
| KR | 2003-0072936 A | 9/2003 |
| KR | 2003-0084436 A | 11/2003 |
| KR | 10-2004-0025980 A | 3/2004 |

* cited by examiner

*Primary Examiner*—Toan N Pham
*Assistant Examiner*—Jennifer Mehmood
(74) *Attorney, Agent, or Firm*—Sughrue Mion, PLLC

(57) ABSTRACT

A broadcast receiver is provided for processing an emergency alert signal. The broadcast receiver includes: a reception unit receiving the emergency alert signal; and a home network-linking unit converting the received emergency alert signal into a packet and transmitting the packet to a home network system connected to the broadcast receiver. The home network-linking unit includes: a priority comparison unit determining the priority of the received emergency alert signal; a policy determination unit determining an alert processing policy to be executed by the home network system according to the priority of the received emergency alert signal; and a packet conversion unit converting the emergency alert signal into the packet to be transmitted to the home network system.

20 Claims, 5 Drawing Sheets

BROADCAST RECEIVER RECEIVING EMERGENCY ALERT SIGNAL AND METHOD OF PROCESSING THE EMERGENCY ALERT SIGNAL

BACKGROUND OF THE INVENTION

This application claims priority of Korean Patent Application No. 10-2005-0000389, filed on Jan. 4, 2005, in the Korean Intellectual Property Office, the disclosure of which is incorporated herein in its entirety by reference.

1. Field of the Invention

Apparatuses and methods consistent with the present invention relate to a broadcast receiver, and more particularly, to a broadcast receiver receiving an emergency alert signal and a method of processing the emergency alert signal.

2. Description of the Related Art

In recent years, there has been growing interest in multi-channel digital broadcasting that will replace analog broadcasting. In digital broadcasting, an audio information signal, a text information signal, and an image information signal are multiplexed and transmitted. Then, the multiplexed signal is received by a digital broadcast receiver via various broadcast media such as satellite broadcasts and terrestrial broadcasts.

In particular, digital television (TV) systems utilized in the Unites States include a moving image stream as well as an emergency alert signal alerting people to emergencies such as natural disasters, riots, radioactive leakages, wars, and so on. According to the Digital Video Subcommittee (DVS) 313 standard of the Society of Cable Telecommunication Engineers (SCTE), the emergency alert signal is included in a digital broadcast signal in the form of an emergency alert system (EAS) packet. Digital broadcast receivers, which receive EAS packets, include digital TVs, set-top boxes, and recorders.

FIG. 1 is a block diagram of a conventional digital TV processing an EAS packet. Referring to FIG. 1, the conventional digital TV receives a digital broadcast signal through a terrestrial or cable network. If the digital broadcast signal includes an EAS packet, which is an emergency alert signal, the digital TV compares the priority of a service that is currently offered now with that of the received EAS packet. If the EAS packet has a higher priority than the service being offered, the digital TV displays emergency alert information included in the EAS packet on a display screen. If the EAS packet has a lower priority than the service being offered, the digital TV ignores the EAS packet.

As described above, the conventional digital TV is configured to process an EAS packet on its own and output emergency alert information included in the EAS packet on a display screen. Therefore, only those who are present in a place where the digital TV is located can be informed of an emergency alert. In addition, the conventional digital TV does not have a mechanism for transmitting the emergency alert to other household appliances.

SUMMARY OF THE INVENTION

The present invention provides a broadcast receiver, which overcomes spatial limitations, is linked with various devices, and receives an emergency alert signal, and a method of processing the emergency alert signal.

According to an aspect of the present invention, there is provided a broadcast receiver receiving an emergency alert signal. The receiver includes: a reception unit receiving the emergency alert signal; and a home network-linking unit converting the received emergency alert signal into a packet and transmitting the packet to a home network system connected to the broadcast receiver.

The receiver may further include a local display unit displaying an emergency alert message indicated by the received emergency alert signal.

The home network-linking unit may include: a priority comparison unit determining the priority of the received emergency alert signal; a policy determination unit determining an alert processing policy to be executed by the home network system according to the priority of the received emergency alert signal; and a packet conversion unit converting the emergency alert signal into the packet to be transmitted to the home network system.

The packet conversion unit may combine the emergency alert signal, the determined alert processing policy, and the address of each device included in the home network system which will execute a command in accordance with each alert processing policy, and create the packet to be transmitted to the home network system.

The emergency alert signal may be an emergency alert system packet that meets a Society of Cable Telecommunication Engineers standard. The address of each device included in the home network system may be an Internet Protocol (IP) address that meets a Transmission Control Protocol (TCP)/IP standard.

According to another aspect of the present invention, there is provided a method of processing an emergency alert signal received by a broadcast receiver. The method includes: receiving the emergency alert signal; and converting the received emergency alert signal into a packet and transmitting the packet to a home network system connected to the broadcasting receiver.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth therein; rather, these exemplary embodiments are provided so that this disclosure will be thorough and complete, and will fully convey the concept of the invention to those skilled in the art.

Figure 1:
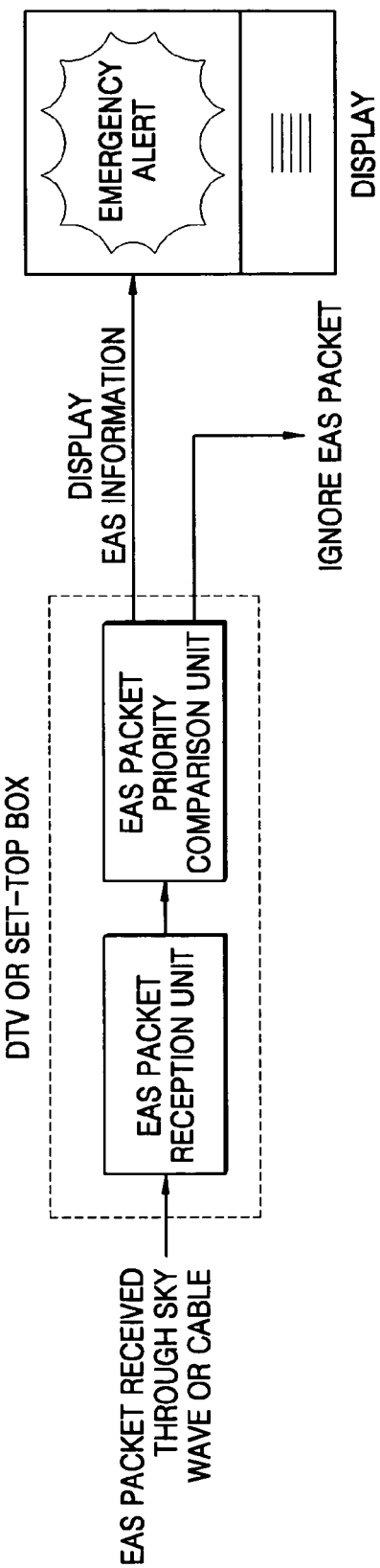
FIG. 1 is a block diagram of a conventional digital TV processing an EAS packet.
Figure 2:
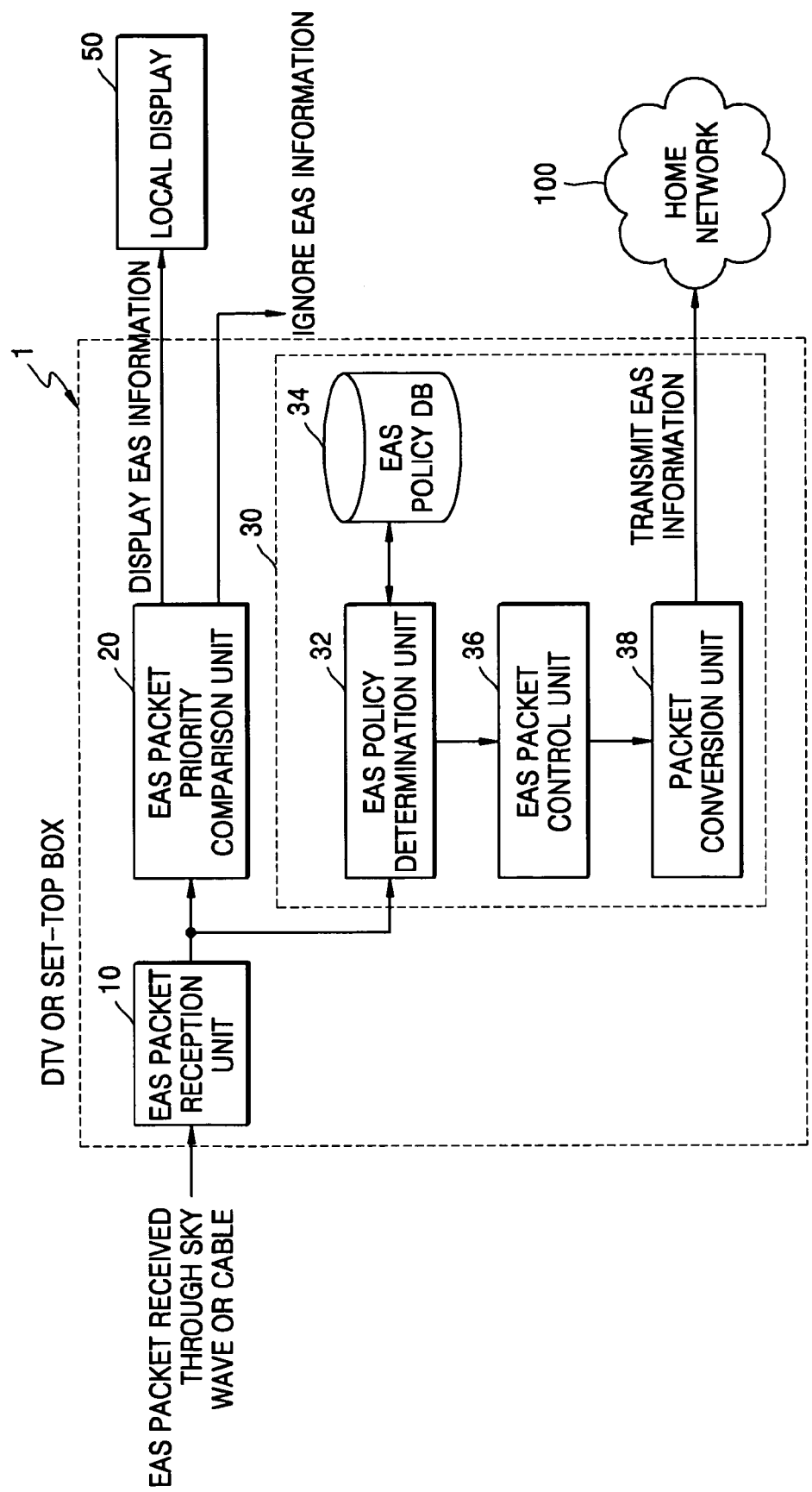
FIG. 2 is a block diagram of a broadcast receiver processing an EAS packet according to an exemplary embodiment of the present invention.

FIG. 2 is a block diagram of a broadcast receiver 1 processing an EAS packet according to an exemplary embodiment of the present invention. Referring to FIG. 2, the broadcast receiver 1 includes an EAS packet reception unit 10, an EAS packet priority comparison unit 20, and a home network-linking unit 30.

The EAS packet reception unit 10 receives an EAS packet for an emergency alert, which is included in a digital broadcast signal via a terrestrial network, a cable network, a satellite, an optical cable, a digital subscriber line and/or other types of wired/wireless media for broadcasting and/or multicasting. The configuration of the EAS packet priority comparison unit 20 is identical to that of the EAS packet priority comparison unit of the conventional digital TV. The EAS packet priority comparison unit 20 compares the priority of a service being offered with that of the received EAS packet. If the EAS packet has a higher priority than the service being offered, the EAS packet priority comparison unit 20 displays an emergency alert based on EAS information included in the EAS packet on a display screen 50. If the EAS packet has a lower priority than the service being offered, the EAS packet priority comparison unit 20 ignores the EAS packet.

The broadcast receiver 1 not only displays the emergency alert on a local display 50 directly connected thereto but also expands the distribution of the emergency alert to a home network system through the operation of the home network-linking unit 30.

Specifically, the home network-linking unit 30 includes an EAS policy determination unit 32, an EAS policy database (DB) 34, an EAS packet control unit 36, and a packet conversion unit 38. The EAS policy determination unit 32 determines the task that each device connected to a home network 100 should carry out in the event of an emergency alert according to the priority of EAS information included in an EAS packet. Tasks that the devices connected to the home network 100 should carry out are stored and managed by the EAS policy DB 34.

For example, the EAS policy determination unit 32 may determine that the devices connected to the home network 100 should perform the following tasks according to the priority of EAS information. The EAS policy determination unit 32 may designate a task of displaying alert messages for a medium-level emergency alert. For a high-level emergency alert, another task in addition to the task for the medium-level emergency alert may be designated. For example, the EAS policy determination unit 32 may instruct a radio or lights to be turned on in addition to the alert messages being displayed.

For a maximum-level emergency alert, the EAS policy determination unit 32 may designate another task in addition to the task for the high-level emergency alert. For example, the EAS policy determination unit 32 may instruct an emergency siren to be sounded or a red light to be flashed in addition to the radio or lights being turned on and the alert messages being displayed.

The EAS policy DB 34 stores lists of tasks for various scenarios predetermined according to the priority of the EAS information included in the received EAS packet. The EAS policy determination unit 32 determines a specific task that each device in the home network 100 should carry out according to a predetermined scenario. Accordingly, operating states of the devices connected to the home network 100 depend on the priority of the emergency alert information.

The EAS packet control unit 36 makes a control command to each device connected to the home network 100 to instruct the device to carry out a predetermined task. The devices in the home network 100 which receive the control command may perform the tasks depending on a predetermined scenario.

The packet conversion unit 38 combines the EAS information included in the received EAS packet, the control command to be executed by each device in the home network 100, and the address of each device in the home network 100 that receives the control command, and generates a packet supported by the home network 100. For example, if the home network 100 supports TCP/IP, the address of each device in the home network 100 is an IP address. The packet conversion unit 38 transmits the generated packets to the corresponding devices in the home network 100.

Accordingly, the broadcast receiver 1, such as a digital TV or a set-top box, not only displays EAS information regarding emergencies such as torrential rains in a nation or an area and earthquakes, but also transmits the EAS information to the home network 100. Thus, all devices connected to the home network 100 receive the EAS information and carry out tasks in various scenarios according to the priority of the received EAS information.

Figure 3:
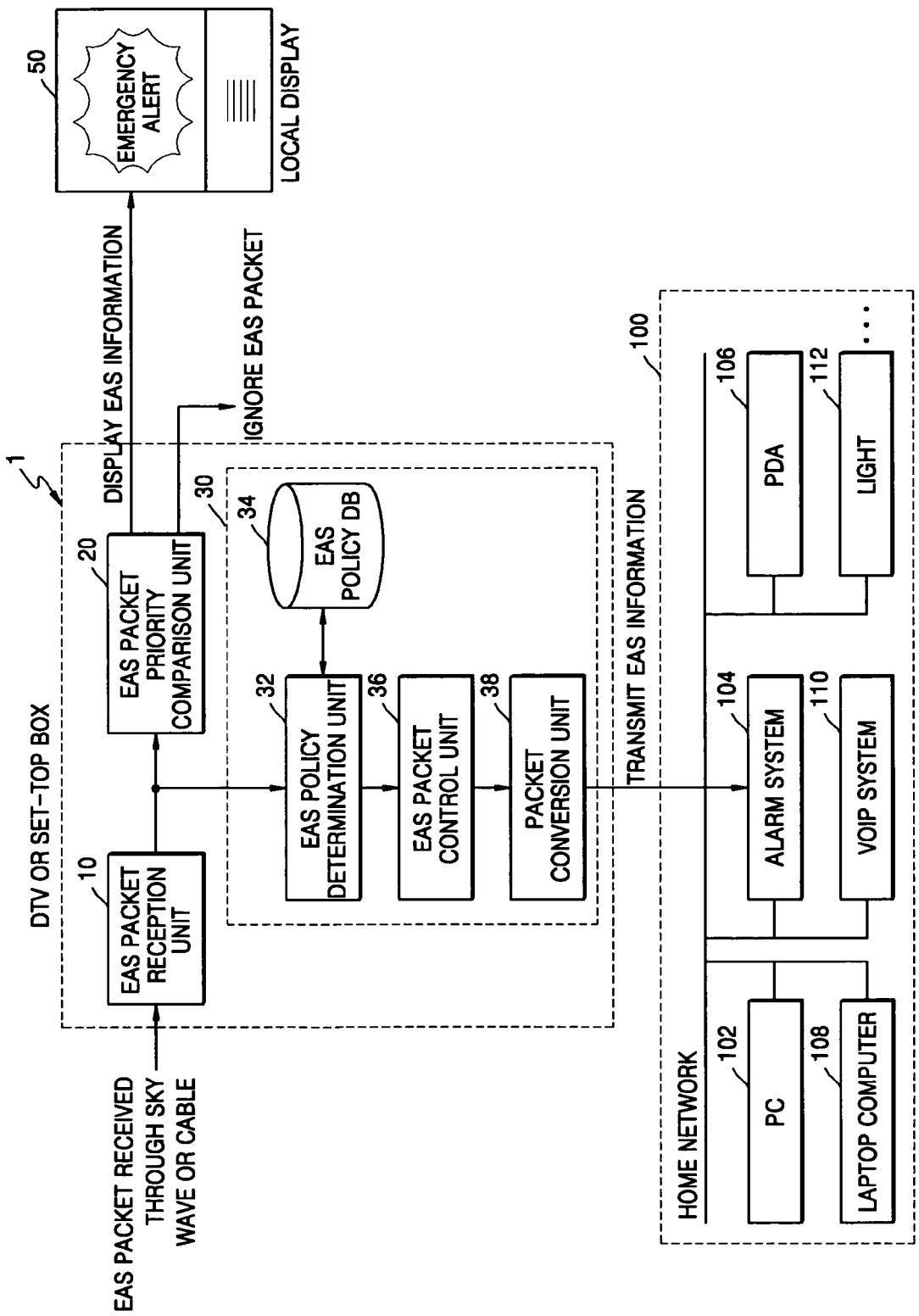
FIG. 3 is a block diagram of an alert system geared with a home network using the broadcast receiver illustrated in FIG. 2.

FIG. 3 illustrates the configuration of an alert system that is linked with the home network 100 using the broadcast receiver 1. Referring to FIG. 3, when an EAS packet is received through a terrestrial network or a cable network together with a broadcast signal, the broadcast receiver 1 displays an emergency alert on a local display 50 and, at the same time, accesses the EAS policy DB 34 to obtain an operation scenario for the devices in the home network 100, which is predetermined according to the priority of the EAS information. According to the obtained scenario, the broadcast receiver 1 converts the EAS packet into an IP packet, which includes a control command for each device in the home network 100 and is supported by the home network 100, and transmits the IP packet to each device in the home network 100.

The home network 100 is linked with the broadcast receiver 1 through middleware such as universal plug and play (UPNP). Each device in the home network 100 executes the transmitted command and performs actions according to an emergency alert. The devices in the home network 100 may include a personal computer (PC) 102, a laptop computer 108, an alarm system 104, a personal data assistant (PDA) 106, a voice over IP (VOIP) system 110, and a light 112, or any combination of them. Various devices not shown in FIG. 3 may be used for an emergency alert.

Figure 4:
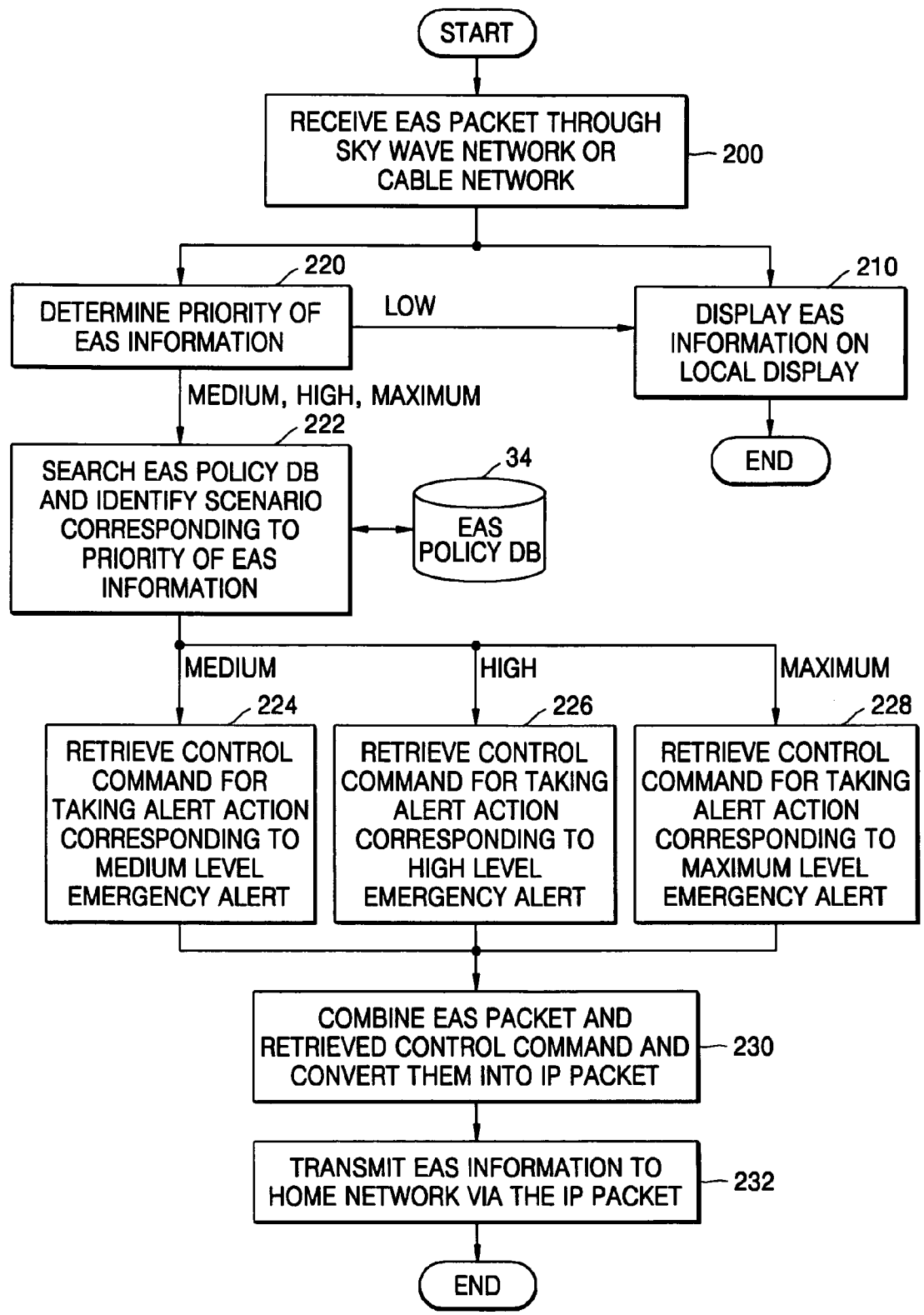
FIG. 4 is a flowchart illustrating a method of processing an alert with the home network according to an exemplary embodiment of the present invention.

FIG. 4 is a flowchart illustrating a method of processing an alert with the home network 100 according to an exemplary embodiment of the present invention. Referring to FIG. 4, the broadcast receiver 1 receives an EAS packet through a sky wave network or a cable network, together with a broadcast signal (operation 200). If the priority of the received EAS packet is low, the broadcast receiver 1 displays the EAS information in the EAS packet on the local display 50 connected thereto (operation 210). If it is determined that the priority of the EAS packet is not low, that is, medium, high or maximum, as a result of comparing the priority of the EAS packet with the priority of a service being offered are designated (operation 220), the broadcast receiver 1 retrieves a list of tasks designated for the priority of the EAS packet from the EAS policy DB 34 (operation 222).

The broadcast receiver 1 retrieves a control command for taking alert action at a level corresponding to the priority of the EAS packet (operations 224 through 228), and combines and converts the EAS packet and the retrieved control commands for taking alert actions into an IP packet supported by the home network 100 (operation 230). The broadcast receiver 1 transmits EAS information including the control commands to the home network 100 via the IP packet (operation 232).

Figure 5:
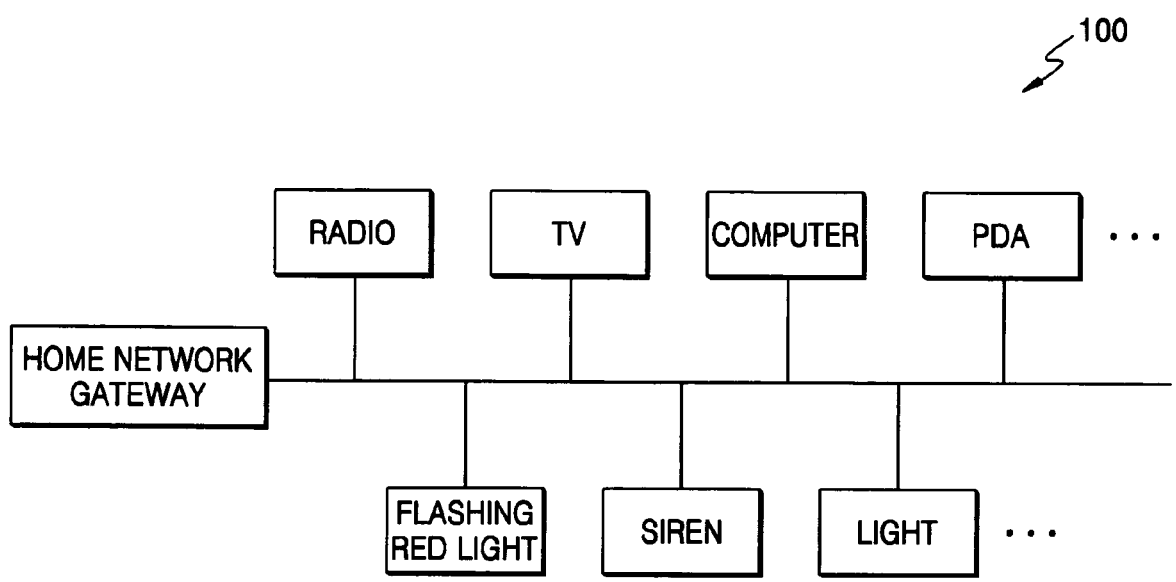
FIG. 5 is a block diagram of the home network system processing an alert according to an exemplary embodiment of the present invention.

FIG. 5 is a block diagram of the home network 100 processing an alert according to an exemplary embodiment of the present invention. Referring to FIG. 5, each device in the home network 100 executes a received control command received and takes action to deal with an alert. For example, if the priority of EAS information is low, the EAS information is displayed on the broadcast receiver 1 only without being transmitted to the home network 100. If the priority of EAS information is medium, emergency alert messages are transmitted to some of the devices in the home network 100, such as a PC, a laptop computer, and a PDA, which may receive and display the emergency alert messages.

If the priority of the EAS information is high, the broadcast receiver 1 instructs radio or lights in the home network 100 to be turned addition to performing operations corresponding to the medium priority. If the priority of the EAS information is maximum, the broadcast receiver 1 instructs a siren to be sound or a red light to flash in addition to performing the operations corresponding to the high priority. In this way, various methods of announcing an emergency alert may be used according to the priority of the EAS information.

As described above, exemplary embodiments of the present invention provide a broadcast receiver which overcomes spatial limitations, is linked with various devices, and receives an emergency alert signal, and a method of processing the emergency alert signal. Accordingly, the broadcast receiver receiving an emergency alert signal not only displays an emergency alert but also is linked with a home network to control various devices in the home network to display the emergency alert and take necessary actions. In addition, since lists of tasks are predetermined according to the priority of each emergency signal, the present invention can be applied to various systems.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A broadcast receiver comprising:
   a reception unit which receives an emergency alert signal containing a priority;
   a home network-linking unit which converts the emergency alert signal into a packet in reference to an alert processing policy which is determined based on the priority, and transmits the packet to a home network system comprising a plurality of devices,
   wherein the alert processing policy predetermines tasks to be performed and designates which devices among the plurality of the devices of the home network system to perform the predetermined tasks,
   wherein if the priority is lower than a given level, the home network linking unit does not convert the emergency alert signal into the packet for transmission to the home network system, and a local display unit connected to the broadcast receiver displays a message corresponding to the emergency alert signal, and
   wherein if the priority is equal to or greater than the given level, the home network linking unit converts the emergency alert signal into the packet and transmits the packet to the home network system.

2. The receiver of claim 1, wherein the local display unit is included in the receiver.

3. The receiver of claim 1, further comprising a priority comparison unit which determines the priority of the emergency alert signal,
   wherein the home network-linking unit comprises:
   a policy determination unit which determines the alert processing policy to be executed by the home network system according to the priority of the emergency alert signal; and
   a packet conversion unit which converts the emergency alert signal into the packet to be transmitted to the home network system.

4. The receiver of claim 3, wherein the home network-linking unit further comprises a policy database which stores the alert processing policy to be executed by the home network system for different priorities, and the policy determination unit determines the alert processing policy to be executed by the home network system based on the alert processing policy stored in the policy database and the priority of the emergency alert signal.

5. The receiver of claim 3, wherein the home network-linking unit further comprises a packet control unit which generates a control command instructing each device connected to the home network to carry out a predetermined task in accordance with the alert processing policy, and the packet conversion unit combines the emergency alert signal, the control command to be executed by each device in the home network, and an address of each device connected to the home network system which is to receive the control command to create the packet to be transmitted to the home network system.

6. The receiver of claim 3, wherein the packet conversion unit combines the emergency alert signal, the alert processing policy, and an address of each device included in the home network system which will execute a command in accordance with the alert processing policy, and creates the packet to be transmitted to the home network system.

7. The receiver of claim 6, wherein the emergency alert signal is an emergency alert system packet that complies with a Society of Cable Telecommunication Engineers standard.

8. The receiver of claim 6, wherein the address of each device included in the home network system is an Internet Protocol (IP) address that meets a Transmission Control Protocol (TCP)/IP standard.

9. A method of processing an emergency alert signal, the method comprising:
   receiving the emergency alert signal at a broadcast receiver;
   determining an alert processing policy based on a priority of the emergency alert signal by the priority comparison unit;

if the priority is equal to or greater than a given level, converting the emergency alert signal into a packet according to the determined alert processing policy; and transmitting the packet to a home network system comprising a plurality of devices, wherein the alert processing policy predetermines tasks to be performed and designates which devices among the plurality of the devices of the home network system to perform the predetermined tasks, wherein if the priority is lower than a given level, the emergency alert signal is not converted into the packet for transmission to the home network system, and a local display unit connected to the broadcast receiver displays the emergency alert signal.

10. The method of claim 9, wherein the priority of the emergency alert signal comprises at least two priorities.

11. The method of claim 9, wherein the method further comprises:

determining the priority of the received emergency alert signal.

12. The method of claim 11, wherein the determining of the alert processing policy comprises accessing an policy database which stores the alert processing policy to be executed by the home network system for different priorities, and determining the alert processing policy to be executed by the home network system based on the alert processing policies stored in the policy database and the priority of the emergency alert signal.

13. The method of claim 11, wherein the converting of the emergency alert signal in to the packet comprises generating a control command instructing each device connected to the home network to carry out a predetermined task in accordance with the alert processing policy, and combining the emergency alert signal, the control command to be executed by each device in the home network, and an address of each device connected to the home network system which is to receive the control command to create the packet to be transmitted to the home network system.

14. The method of claim 11, wherein the converting of the emergency alert signal in to the packet comprises combining the emergency alert signal, the alert processing policy, and an address of each device included in the home network system which will execute a command in accordance with the alert processing policy, and creating the packet to be transmitted to the home network system.

15. The method of claim 14, wherein the emergency alert signal is an emergency alert system packet that complies with a Society of Cable Telecommunication Engineers standard.

16. The method of claim 14, wherein the address of each device included in the home network system is an Internet Protocol (IP) address that meets a Transmission Control Protocol (TCP)/IP standard.

17. The receiver of claim 1, wherein the local display unit is not included in the home network system.

18. The method of claim 9, wherein the local display unit is not included in the home network system.

19. The receiver of claim 1, wherein if the priority is equal to or greater than the given level, the local display unit displays the emergency alert message.

20. The method of claim 9, wherein if the priority is equal to or greater than the given level, the local display unit displays the emergency alert message.

* * * * *